Figure 3:
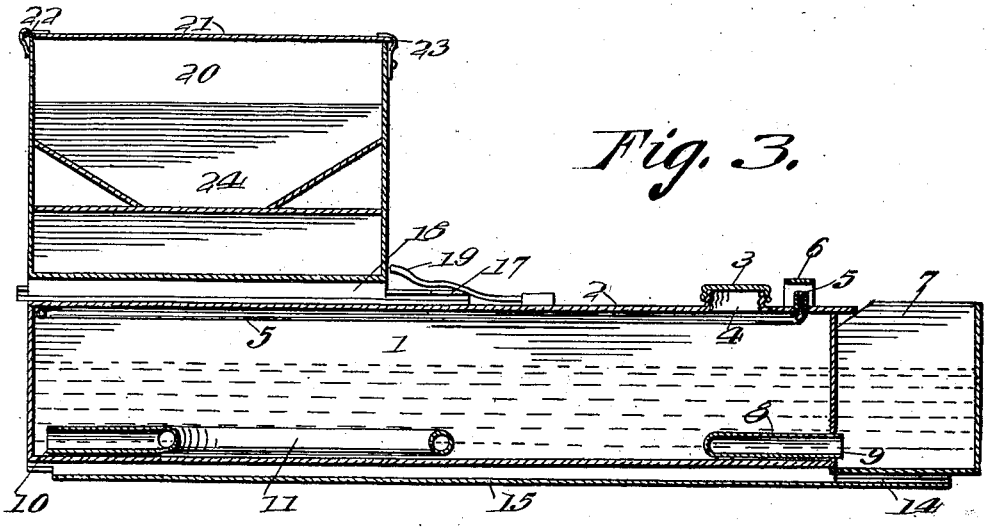

P. H. HERNDON.
WATER TANK FOR FOWLS.
APPLICATION FILED MAR. 1, 1910.
988,266.
Patented Mar. 28, 1911.
2 SHEETS—SHEET 1.
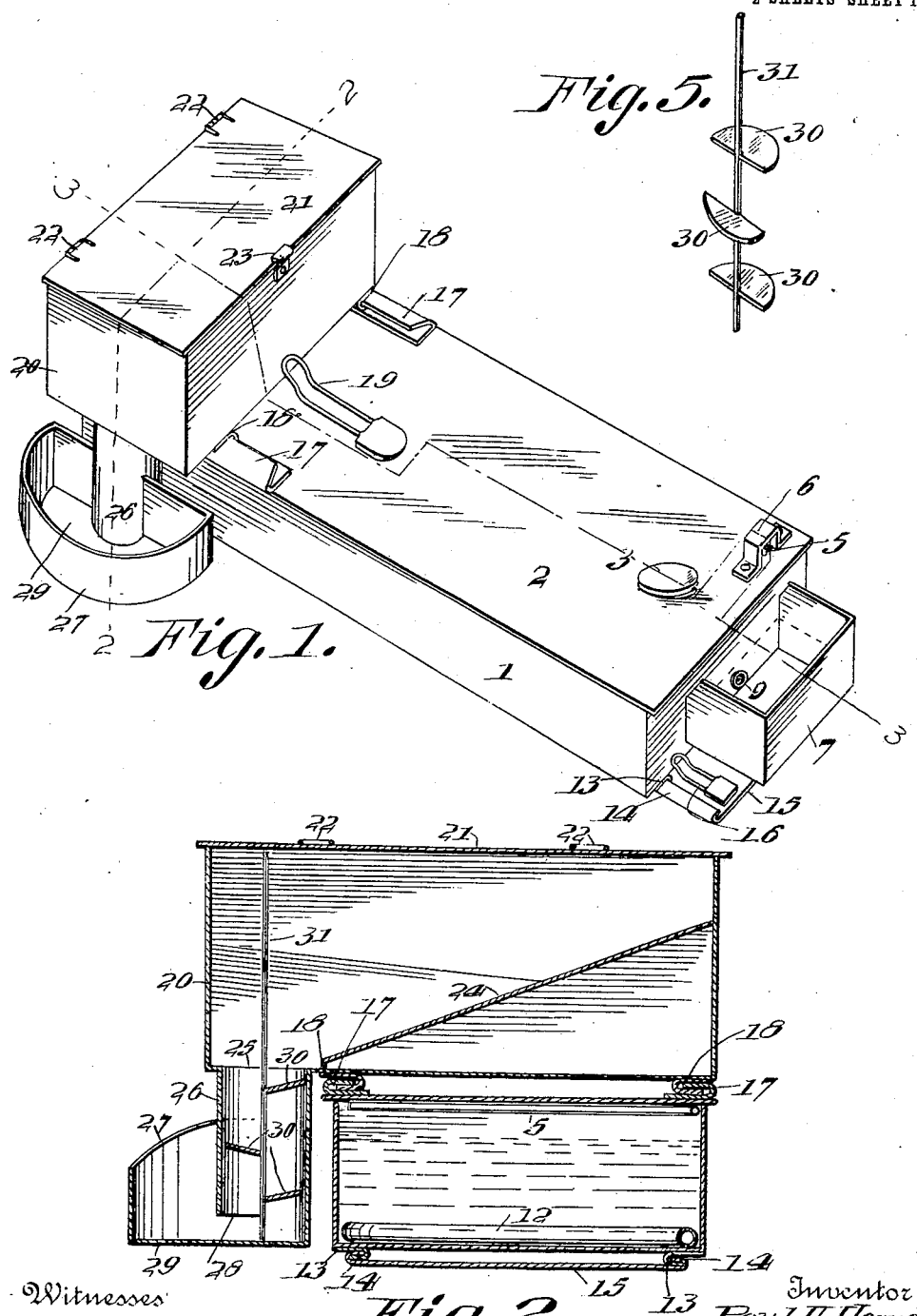

P. H. HERNDON.
WATER TANK FOR FOWLS.
APPLICATION FILED MAR. 1, 1910.

988,266.

Patented Mar. 28, 1911.

2 SHEETS—SHEET 2.

Witnesses
M. A. Bond.
John _____

Inventor
Paul H. Herndon,
E. H. Bond
Attorney

UNITED STATES PATENT OFFICE.

PAUL H. HERNDON, OF TAMPA, FLORIDA, ASSIGNOR OF ONE-FOURTH TO FRANCIS M. PARKER, OF TAMPA, FLORIDA.

WATER-TANK FOR FOWLS.

988,266.

Specification of Letters Patent.  Patented Mar. 28, 1911.

Application filed March 1, 1910.  Serial No. 546,707.

*To all whom it may concern:*

Be it known that I, PAUL H. HERNDON, a citizen of the United States of America, and resident of Tampa, in the county of Hillsboro and State of Florida, have invented certain new and useful Improvements in Water-Tanks for Fowls, of which the following is a specification.

This invention relates to certain new and useful improvements in combination water tanks and feed boxes or troughs for fowls, etc., and has for its objects among others to provide a simple and cheap, yet efficient device of this character which can be readily fastened to the bottom of the coop in one corner or in any other desired position, so that the fowls during shipment or transportation may be properly fed, the construction being such that in the ordinary handling of the device the water in the tank and the grain in the feed box will all be saved for the fowls, spilling only the small amount of water or grain in the cup and feeding pan. The drinking cup is small and the rim is made sufficiently sharp to prevent the chicken or other fowl from roosting on top thereof in the coop and, hence, the water in the tank will not be polluted by the fowls, the tank being covered by an air-tight cover and the water from said tank always flowing out and none going in from the drinking cup.

Provision is made for the gradual feeding of the food or grain in a novel manner, means being provided for supporting the weight of the grain and allowing it to drop slowly into the feed pan to take the place of the feed as it is consumed from the pan by the fowls. This device works loosely in the feed spout leading to the pan, so that there is sufficient agitation or vibration caused by the pecking of the chickens or fowls at the grain on the bottom of the feed pan to keep the feeding device sufficiently agitated to prevent choking of the feed spout by the grain.

I aim further to provide a construction whereby waste of the feed by the fowls is prevented as is also the working up of the feed high in the pan and running over.

The water tank and the feed box are detachably mounted in position and the feed box is detachably mounted upon the water tank.

Suitable provision is made for supplying water to the tank and feed to the feed box and the device as a whole is compact in its nature and the parts so devised and arranged as to give the best results.

Other objects and advantages of the invention will hereinafter appear and the novel features thereof will be particularly pointed out by the appended claims.

The invention is clearly illustrated in the accompanying drawings, which, with the numerals of reference marked thereon, form a part of this specification, and in which—

Figure 4:
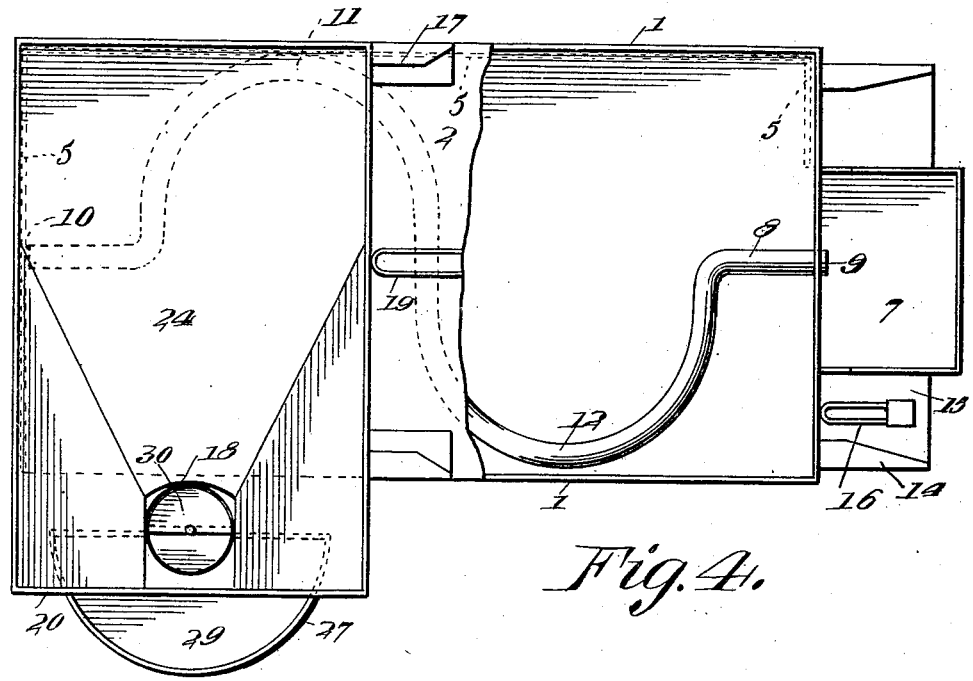

Figure 1 is a perspective view of the combined water tank and feed box complete. Fig. 2 is a vertical transverse section on the line 2—2 of Fig. 1. Fig. 3 is a vertical longitudinal section on the line 3—3 of Fig. 1. Fig. 4 is a top plan of the device with portions broken away. Fig. 5 is a perspective detail of the agitating device removed from the feed spout.

Like numerals of reference indicate like parts throughout the several views.

In the present instance I have illustrated what I consider one of the most practical forms of embodiment of the invention, but it is to be understood that the same is subject to changes, variations and modifications in details, proportion of parts, etc. without departing from the spirit of the invention or sacrificing any of its advantages. It is to be understood, however, that the invention is not to be restricted to such details.

Referring to the drawings, 1 designates the water tank, preferably of galvanized iron or some analogous material of any desired shape, in the present instance being shown as rectangular in form, having a top 2 fitted air-tight thereupon and provided with a removable closure 3 closing the inlet or filling opening 4.

5 is an air vent which may be located at any desired point on the tank, being preferably covered by a shield or guard 6 for an obvious purpose, as seen clearly in Figs. 1 and 3. At one end of this tank, the water cup 7 of any suitable dimensions is located, the upper edge of which is sufficiently thin and sharp to make it undesirable as a roost for the chickens or fowls.

8 is a pipe lying flat on the bottom of the watering tank within the same, being secured thereto in any suitable manner. One end of this pipe empties into the watering cup 7, as seen at 9, at this point extending lengthwise of the tank at substantially its transverse center, the other end of the pipe terminating a short distance, say one-half of an inch or so from the opposite end of the tank, as seen at 10, being open at such end. Between the opposite ends of the said pipe, the latter is formed with reverse bends 11 and 12 extending upon opposite sides of the central line, the bend 11 extending upon one side of the central longitudinal line of the tank and practically to the side of the tank, while the bend 12 extends upon the opposite side of the said central longitudinal line and practically to the opposite edge of the tank. These two bends 11 and 12 form traps. If the tank is held in such position that the drinking cup 7 is down, the end 10 of the supply pipe 8 within the tank will be above the water and, consequently, no water can pass therethrough to enter the cup. If it is placed on either side, the bends in the pipe being above the water form (upon the entrance of air) traps, so that no water can pass to the cup and if the tank is turned upside down, the whole supply pipe is above the water and if the tank is placed with the end carrying the drinking cup turned up, the end of the supply pipe that enters said cup will be above the water so that no water can be wasted. When placed in the normal position, the water will slowly fill the drinking cup, but, as will be understood, the latter cannot run over as the water therein cannot get above the level of the water within the tank. The vent 5 permits of the ingress of air to take the place of the water drawn out so that the water at all times will flow out of the tank into the cup when the tank is in its normal position. This vent is so disposed that some part of it will, at all times, be above the water, no matter in what position the tank is placed, so as to prevent the water from leaking out through the air vent when the tank is in any position except when inverted, which latter position it is not likely to assume. It extends along one end and one side and for a distance along the other end, as seen in dotted lines in Fig. 4.

If it is desired to fasten the water tank to the bottom of a coop or other place, I provide the under side of the tank with flanges 13, as seen clearly in Fig. 2, which are adapted to coöperate and interlock with oppositely disposed flanges 14 upon a base plate or the like 15 adapted to be secured to the bottom of the coop or other place, so that sliding engagement is afforded between said plate and the water tank, as will be readily understood upon reference to Figs. 1 and 2. In order to hold the parts in such position and prevent accidental displacement thereof, I provide a spring catch 16 secured to the top of the base plate or member 15, as seen best in Figs. 1 and 4. As the tank is pushed into position from the end, the pressure of the tank upon the spring catch will depress the latter so that the tank may be readily slid into position and when the end of the tank passes the catch, the latter will spring up and engage the end of the tank so as to lock the latter in position, as will be best understood upon reference to Fig. 1.

Any available means may be provided for preventing the feed box from slipping toward the left, such as any suitable stop or the base may be placed so that the wall of the coop in which it is used would act as a stop to prevent such movement.

The tank constructed as above may sometimes be employed alone, and sometimes in connection with the feed trough or box now to be described. It is evident, however, that the feed trough or box may be employed independent of the tank, although it is designed usually that the two shall be used in conjunction, in which case and for which purpose the top of the tank is provided with the flanges or guides 17, as seen in Fig. 1, which are disposed at one end thereof and with which are designed to coöperate the oppositely disposed but similarly constructed flanges 18 on the under side of the feed box. Figs. 1 and 2 show clearly the interengagement of these flanges or slides and in Fig. 1 is shown a spring catch 19 similar to the spring catch 16 hereinbefore described, said catch 19 being secured to the top of the tank and designed to engage the adjacent wall of the feed box to hold it against disengagement, the operation and function being substantially the same as that of the spring catch 16 just described in connection with the base plate 15 and the water tank.

The box 20 is of galvanized iron or any suitable material and is provided with a top 21, hinged at 22, or otherwise made movable, so as to permit of introduction of the feed. A catch 23 which may be of any ordinary construction is shown for the purpose of keeping the cover 21 in its closed position. This box has a bottom 24 inclined toward the discharge opening 25 which is at the end of the box and which has extending downwardly therefrom the tubular portion 26 which is disposed within the feed cup 27 supported by said tubular portion, as seen clearly in Fig. 1. The bottom wall of the outer half of this tubular member terminates at a distance from the bottom 29 of the cup, as seen at 28 in Fig. 2. The bottom of the box inclining toward this outlet aperture 25 insures constant flow of the feed to such opening or aperture and thence downward through the tubular member 26 to the feed box 27. In order, however, to prevent too rapid flow or feed of the grain or food within the box 20, I place within the tubular member 26 a plurality of substantially semi-circular plates 30 carried by a rod 31, said plates being arranged at different heights upon the rod and alternately disposed upon opposite sides thereof. These plates are slightly inclined, as seen best in Fig. 2, and work loosely within the tubular member or feed spout 26, thus allowing the same to shake a little from the vibration of the feed box or pan. The rod 31 carrying these plates rests on the bottom 29 of the feed cup or pan and its upper end extends to practically the under face of the cover or lid 21 of the box which holds it firmly in place when the feed box is full of grain and the lid closed. These plates serve to prevent choking of the feed within the feed spout and also serve to regulate the outlet of the feed through the opening at the bottom 28 of the feed spout, which, as above described, is a short distance from the bottom of the feed cup, so as to allow the grain to come out freely from the spout. When the cup fills up to the bottom of the spout, it closes the mouth of the latter and no more grain can get into the feed cup until some of that therein is consumed by the fowls. When the feed box is placed in any other than its normal position, the inclined plates will prevent the grain or feed from coming out. The upper edge of the feed cup comes a little above the mouth of the spout, thus preventing the fowls from wasting the grain and also preventing the grain from working up too high in the feed cup and running over. When used in shipping fowls on trains where there is a constant vibration, this prevents waste of the feed.

As will be understood, the bottom of the feed cup is on the same plane as the bottom of the water tank, as will be evident from Fig. 2.

What is claimed as new is:—

1. In a device of the character described, a receptacle, and outlet means within the same along the bottom thereof through which the contents can automatically discharge in the normal upright position of the receptacle, said outlet means constructed to entrap air to prevent discharge.

2. In a device of the character described, a water tank provided upon its interior along the bottom with a sinuous outlet pipe, the sinuosities of which extend in opposite directions upon opposite sides of the central line through the tank.

3. In a device of the character described, a water tank provided upon its interior along the bottom with a sinuous outlet pipe, the sinuosities of which extend in opposite directions upon opposite sides of the central line through the tank, one end of said pipe terminating near the end of the tank opposite to the discharge end of said pipe.

4. In a device of the character described, a water tank having a cup upon the exterior thereof and a pipe on the bottom of the tank with one end communicating with said cup and the other end terminating near the opposite end of the tank.

5. In a device of the character described, a water tank having a cup at one end and an outlet pipe within the tank having one end communicating with said cup, said pipe being provided with a trap.

6. In a device of the character described, a water tank having a cup at one end and an outlet pipe within the tank having one end communicating with said cup, said pipe being provided with traps upon opposite sides of the longitudinal center of the tank.

7. In a device of the character described, a water tank provided with an outlet pipe secured to the bottom thereof and having oppositely disposed curves intermediate its ends.

8. In a device of the character described, a water tank provided with an outlet pipe secured to the bottom thereof and having oppositely disposed curves intermediate its ends, one end terminating at a short distance from the end of the tank and the other end arranged to discharge through the opposite end of the tank.

Signed by me at Tampa—Florida this 25th day of February 1910.

PAUL H. HERNDON.

Witnesses:
B. S. ROBERTSON,
G. E. SEEM.